United States Patent
Samuelson et al.

(10) Patent No.: US 6,253,625 B1
(45) Date of Patent: Jul. 3, 2001

(54) TARGET FLOW METERS WITH IMMERSED STRAIN GAUGES

(75) Inventors: Duane Samuelson; Stephen Kaylor; Gordon Yowell, all of Boca Raton; Alvin S. Blum, Fort Lauderdale, all of FL (US)

(73) Assignee: Predator Systems, Inc., Boca Raton, FL (US)

( * ) Notice: Subject to any disclaimer, the term of this patent is extended or adjusted under 35 U.S.C. 154(b) by 0 days.

(21) Appl. No.: 09/689,950

(22) Filed: Oct. 13, 2000

(51) Int. Cl.[7] ........................................................ G01F 1/28
(52) U.S. Cl. ........................................ 73/861.71; 73/861.74
(58) Field of Search ............................. 73/861.71, 861.73, 73/861.74

(56) References Cited

U.S. PATENT DOCUMENTS

| | | | |
|---|---|---|---|
| 2,826,914 | 3/1958 | Reiley | 73/228 |
| 3,098,384 | 7/1963 | Nusbaum | 73/228 |
| 3,340,733 | 9/1967 | Lasher | 73/228 |
| 3,599,139 | * 8/1971 | Low | 338/2 |
| 4,604,906 | * 8/1986 | Scarpa | 73/861.74 |
| 4,788,869 | * 12/1988 | Li | 73/861.71 |
| 4,892,114 | 1/1990 | Maroney | 137/87 |
| 5,425,278 | * 6/1995 | Perkins | 73/861.632 |
| 6,003,387 | * 12/1999 | Larson et al. | 73/861.73 |

* cited by examiner

Primary Examiner—Harshad Patel
(74) Attorney, Agent, or Firm—Alvin S. Blum

(57) ABSTRACT

A target flow meter has a target with a broad face attached to the free end of an elastic stalk. The stalk has at least a portion with an oblong cross section. A fixed end of the stalk is attached to a rigid support secured in the system to be measured with the broad face disposed transverse to the fluid flow. Strain gauges are affixed to the longer sides of the oblong portion. A temperature sensor may also be affixed there. The strain gauges are immersed in the fluid to be measured. Wires to the gauges and sensor pass through a fixed seal to the outside. They may be protected from the fluid by an impervious coating. By applying the strain gauges within the fluid, the system may be reduced in size, achieve greater sensitivity, and better temperature compensation.

13 Claims, 2 Drawing Sheets

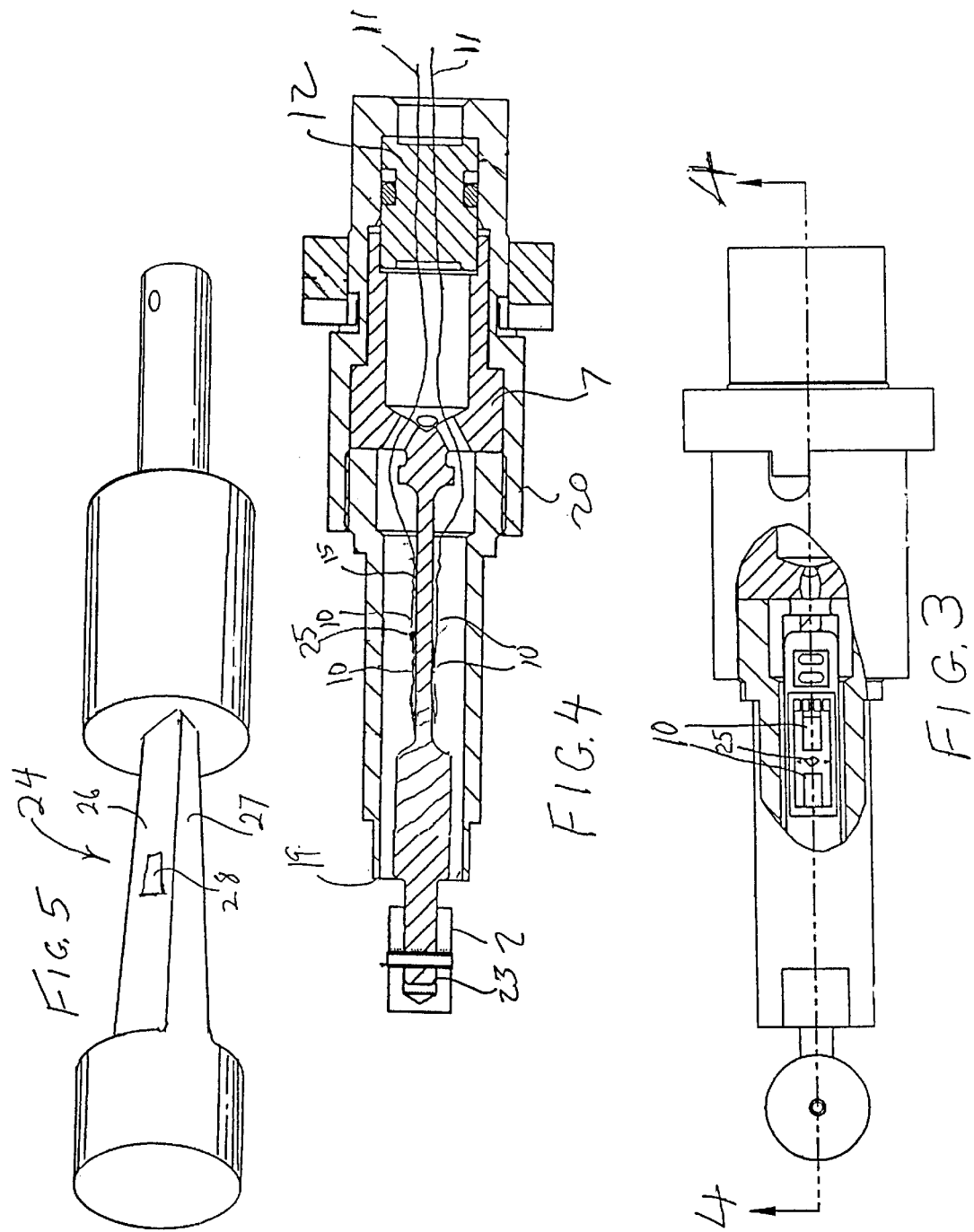

TARGET FLOW METERS WITH IMMERSED STRAIN GAUGES

BACKGROUND OF THE INVENTION

This invention relates to devices in fluid paths that indicate flow rate, and more particularly to target type flow meters having a target in the flow path attached to a stalk having attached strain gauges immersed in the fluid for enhanced sensitivity.

DESCRIPTION OF THE PRIOR ART

Target flow meters have distinct advantages over other types of flow meters. They operate on the principle that the amount of force generated by onrushing fluid passing a disc target whose surface is oriented perpendicular to the direction of flow is proportional to the square of the flow velocity. The drag beyond the target produces a lower pressure area than ahead of the target, producing a net force that bends the stalk. This makes for easy calibration. The target typically is mounted by a rigid stalk to a bendable balance beam to permit its deflection by the force. Strain gauges affixed to the balance beam outside the fluid measure the bending of the balance beam. They have no moving parts, only a bending part for minimal maintenance. Because of the considerable loss of energy in bending the balance beam, these flow meters are not sensitive. These flow meters have the advantage that the electrical elements and wires are all outside the fluid, eliminating sealing and leakage problems.

Nusbaum, in U.S. Pat. No. 3,098,384 teaches a twisted blade immersed in a sewage flow. The blade is periodically retracted and wiped of contaminants. A pair of waterproof strain gauges are bonded to the blade to measure how much the blade is twisted in response to the flow rate. A complex relationship between degree of twist and flow rate must be established for each installation.

SUMMARY OF THE INVENTION

It is accordingly an object of the invention to provide a target flow meter that is more sensitive. It is another object that the flow meter be simpler and more compact in structure. The target flow meters of the invention have a target positioned in the flow path by an attached flexing stalk. The stalk has a substantially oblong cross section with the longer sides disposed transverse to the flow path. Strain gauges are applied directly to the stalk on the longer sides within the fluid chamber to sense the bending of the stalk in response to the force. The stalk may be specially constructed to concentrate the bending at the strain gauges. Wires connected to the strain gauges pass through a pressure seal to the outside. The wires and gauges may be coated to isolate them from the fluid. Direct simple mathematical relationship is maintained between the flow rate and strain gauge output in the turbulent flow range. Because the strain gauges are immersed in the same fluid as the target, there is less error associated with temperature differences between the fluid and ambient than in flow meters whose gauges are outside the fluid. A temperature sensing element may be included with the strain gauges for enhanced measurement accuracy. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 3 is a side view of the flow meter with the housing partially broken away.

FIG. 4 is a sectional view taken on line 4—4 of FIG. 3.

FIG. 5 is a perspective view of the stalk of another embodiment of the invention.

DETAILED DESCRIPTION OF PREFERRED EMBODIMENTS

Figures 1, 2:
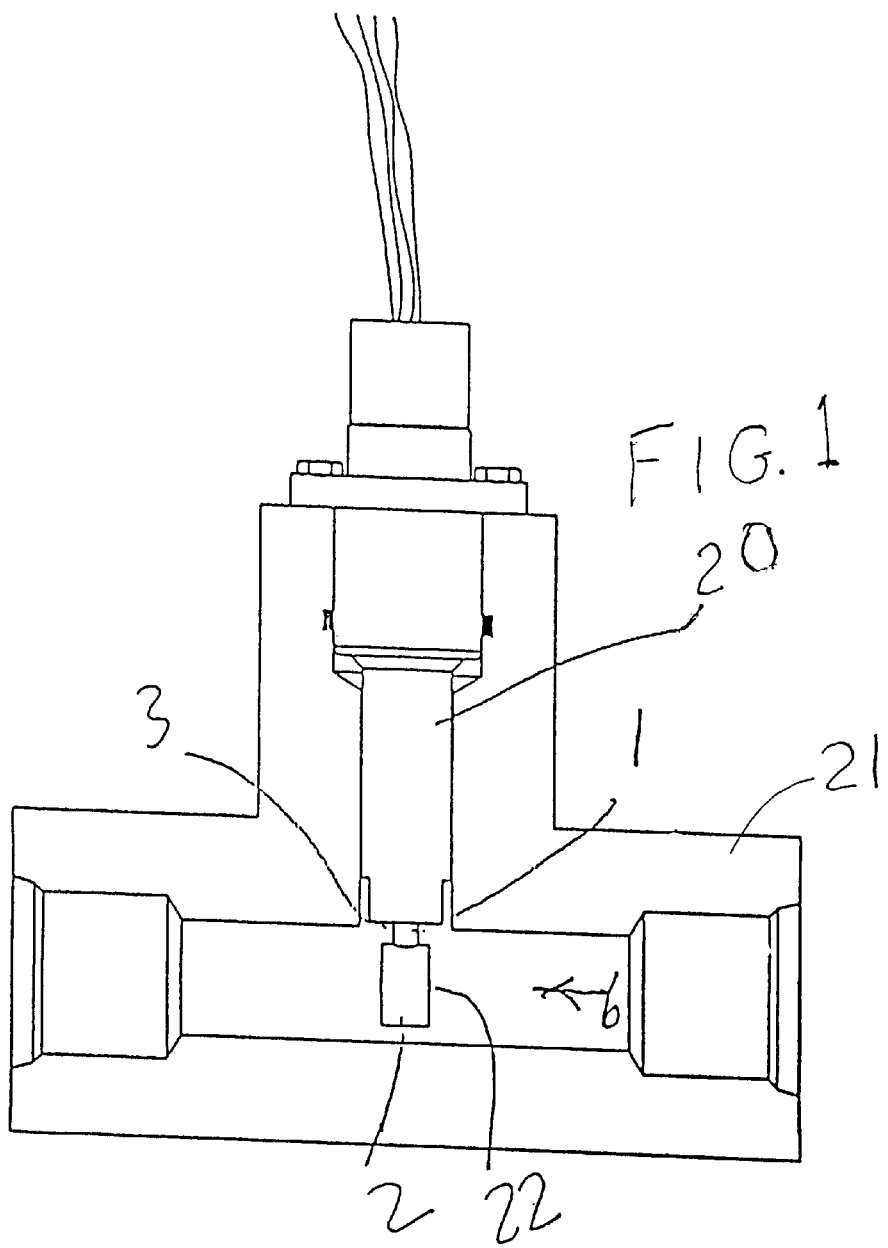
FIG. 1 is a diagrammatic view of the flow meter in use.
FIG. 2 is a perspective view of the flow meter.

Referring now to the drawing FIGS. 1–4, a target flow meter 1 of the invention is mounted in a housing 20 to facilitate insertion into an assembly 21 with a fluid flow channel 6. The target member 2 is mounted with its broad face 22 transverse to the fluid flow. The target member 2 is mounted on an elongate elastic stalk 3. The stalk is formed from a round metal rod with a free end 23 fastened to the target and an opposite end fixed to a rigid support element 7. A portion closer to the fixed end is machined to a substantially oblong rectangular cross section with longer sides 15 parallel to the broad face, to facilitate bending of the stalk at that location with fluid flow. Strain gauges 10 are affixed to the flat sides 15 to provide an electrical signal proportional to flow rate. A temperature sensor 25 may be included with the gauges. Wires 11 connected to the strain gauges pass through the fluid seal 12 to a point outside the fluid. A portion of the housing extends around the stalk and terminates in a stop element 19, which limits the extent of bending of the stalk. The electrical elements within the fluid may be coated with protective material as required by the nature of the fluid environment to which it may be exposed. Referring now to FIG. 5, another stalk 24 is shown, in which the shorter sides 27 and the longer sides 26 are both reduced in the portion supporting the strain gauges. Thereby ensuring that most of the bending will occur at that portion and be sensed by the strain gauges 28 for maximum sensitivity. That portion may also be tapered with the thickness decreasing as the distance to the target decreases, so that the bending of the stalk will be uniform. That makes positioning of the gauges less critical. The tapers have been exaggerated here for illustrative purposes.

The above disclosed invention has a number of particular features which should preferably be employed in combination, although each is useful separately without departure from the scope of the invention. While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A flow meter for use within a fluid system for measuring fluid flow in a flow path, the flow meter comprising:
   a) an elongate elastic stalk having a long axis, a first end, a second end, and at least a portion that is substantially oblong in cross section, with the longer sides transverse to the flow path;
   b) a target member having a substantially flat face attached to the first end of the stalk, and arranged to be positioned in the path of the fluid flow to be measured with the flat face of the target member transverse to the flow;
   c) a support element attached to the second end of the stalk for holding the target member in position;
   d) sealing means for sealing the support element into the fluid system;

e) a plurality of strain gauges affixed to said longer sides of the stalk intermediate the first and second ends;

f) a plurality of wires connected at one end to the strain gauges and passing sealingly through the support element to an area outside the fluid system; and g) a resilient coating on the strain gauges and wires to isolate them from the fluid.

2. The flow meter according to claim 1, in which the plurality of strain gauges is positioned closer to the second end of the stalk.

3. The flow meter according to claim 1, further comprising a temperature sensor applied to the stalk.

4. The flow meter of claim 1, further comprising a housing connected to the support element, disposed around the stalk, and provided with stop means for limiting deflection of the stalk.

5. The flow meter according to claim 1, in which said portion is tapered by the shorter sides being reduced as the target member is being approached, so that bending is uniform along the long axis.

6. The flow meter according to claim 1, in which the longer sides are reduced in dimension at the portion of the stalk in contact with the strain gauges to enhance sensitivity.

7. The flow meter according to claim 1, in which the shorter sides are reduced in dimension at the portion of the stalk in contact with the strain gauges for enhanced sensitivity.

8. A flow meter for use within a fluid system for measuring fluid flow in a flow path, the flow meter comprising:

a) an elongate elastic stalk having a long axis, a first end, a second end, and at least a portion that is substantially oblong in cross section, with the longer sides transverse to the flow path;

b) a target member having a substantially flat face attached to the first end of the stalk, and arranged to be positioned in the path of the fluid flow to be measured with the flat face of the target member transverse to the flow;

c) a support element attached to the second end of the stalk for holding the target member in position;

d) sealing means for sealing the support element into the fluid system;

e) a plurality of strain gauges affixed to said longer sides of the stalk intermediate the first and second ends; and f) a plurality of wires connected at one end to the strain gauges and passing sealingly through the support element to an area outside the fluid system.

9. The flow meter according to claim 8, in which the plurality of strain gauges is positioned closer to the second end of the stalk.

10. The flow meter according to claim 8, further comprising a temperature sensor applied to the stalk.

11. The flow meter according to claim 8, further comprising a housing connected to the support element, disposed around the stalk, and provided with stop means for limiting deflection of the stalk.

12. The flow meter according to claim 8, in which the longer sides are reduced in dimension at the portion of the stalk in contact with the strain gauges to enhance sensitivity.

13. The flow meter according to claim 8, in which the shorter sides are reduced in dimension at the portion of the stalk in contact with the strain gauges for enhanced sensitivity.

* * * * *